United States Patent [19]

Steffen et al.

[11] 4,153,646

[45] May 8, 1979

[54] GRAFT COPOLYMERS

[75] Inventors: Ulrich Steffen, Leverkusen; Heinrich Alberts, Cologne; Richard Prinz, Leverkusen, all of Fed. Rep. of Germany

[73] Assignee: Bayer Aktiengesellschaft, Leverkusen-Bayerwerk, Fed. Rep. of Germany

[21] Appl. No.: 857,119

[22] Filed: Dec. 5, 1977

[30] Foreign Application Priority Data

Dec. 11, 1976 [DE] Fed. Rep. of Germany ....... 2656228

[51] Int. Cl.$^2$ .......................................... C08F 263/04
[52] U.S. Cl. .................................................. 260/878 R
[58] Field of Search .................................... 260/878 R

[56] References Cited

U.S. PATENT DOCUMENTS

| | | | |
|---|---|---|---|
| 3,547,755 | 12/1970 | Oberst et al. | 260/878 R |
| 3,553,072 | 1/1971 | Oberst et al. | 260/878 R |
| 3,742,090 | 6/1973 | Kiuchi et al. | 260/878 R |
| 3,855,353 | 12/1974 | Alberts et al. | 260/878 R |
| 3,901,954 | 8/1975 | Alberts et al. | 260/878 R |
| 3,962,371 | 6/1976 | Alberts et al. | 260/878 R |
| 4,071,580 | 1/1978 | Alberts et al. | 260/878 R |

*Primary Examiner*—Alan Holler
*Attorney, Agent, or Firm*—Connolly and Hutz

[57] ABSTRACT

A graft copolymer which is suitable for use as coating material and thermoplastically processible resin consisting essentially of (A) from 10 to 80%, by weight, of an ethylene/vinyl ester copolymer having a vinyl ester content of from 1 to 75%, by weight; and, grafted thereon, (B) from 90 to 20%, by weight, of a monomer mixture comprising:
  (I) from 5 to 50%, by weight, of acrylonitrile and/or methacrylonitrile;
  (II) from 94.9 to 35%, by weight, of an aromatic monovinyl compound;
and
  (III) from 0.1 to 15%, by weight, of an optionally N-substituted acrylamide and/or methacrylamide;

the sum of (A) and (B) and I-III being 100%, by weight.

4 Claims, No Drawings

GRAFT COPOLYMERS

This invention relates to graft copolymers obtained fron ethylene copolymers as graft base and a mixture of acrylonitrile, aromatic mono vinyl compounds, (meth) acrylamide and N-substituted (meth) acrylamides as graft monomers and to a process for the preparation thereof.

As is well known, radical grafting of styreneacrylonitrile mixtures on ethylene copolymers results in incompatible and inhomogeneous graft copolymers which have poor mechanical properties. In these products, the resin phase exists to a large part as free styreneacrylonitrile copolymer (J. L. Locatelli, G. Riess, Angew. Makromolekulare Chem. 32 (1973) 117; British Pat. No. 917,498).

The yields of graft copolymers obtained and the mechanical properties thereof may be improved by the addition of certain comonomers, such as α-olefins (German Offenlegungsschrift No. 2,215,588) or vinyl chloride (German Offenlegungsschrift No. 2,509,403), but these monomers have certain disadvantages. α-olefins lower the molecular weight of the resin phase and are not always used up quantitatively in the polymerisation process while vinyl chloride is difficult to use as comonomer on account of its toxicity.

It is therefore an object of the present invention to provide copolymerisable monomers which are active as graft monomers and give rise to graft polymers having satisfactory properties without the disadvantages mentioned above. This problem is solved by using from 0.1 to 15%, by weight, preferably from 2.5 to 12%, by weight, of (meth) acrylamide, based on the quantity of monomer mixture which is required to be grafted on the base. The present invention therefore relates to graft copolymers of ethylene copolymers and olefinically unsaturated monomers, characterised in that they contain graft polymerised units of mixtures of (meth) acrylonitrile, an aromatic monovinyl compound and (meth) acrylamide or a N-substituted (meth) acrylamide on ethylene/vinyl ester copolymers.

The graft bases may be ethylene/vinyl ester copolymers containing from 1 to 75%, by weight, preferably from 35 to 50%, by weight, of polymerized vinyl esters. The vinyl esters used may be monocarboxylic acids having from 1 to 10 carbon atoms in the alkyl group, preferably vinyl acetate.

The ethylene/vinyl ester copolymers may have Mooney viscosities ML 4/100° C. determined according to DIN 53 523 of from 15 to 80, preferably from 20 to 45, and intrinsic viscosities $[\eta]$ of from 0.5 to 1.5 dl/g. These copolymers are soluble in hydrocarbons and those which have relatively high vinyl ester contents are also soluble in alcohols. The monomers grafted on the bases may be (meth) acrylonitrile, (meth) acrylamide and aromatic monovinyl compounds, such as styrene, α-methyl styrene and styrenes which are substituted in the nucleus, such as alkyl styrenes having from 1 to 4 carbon atoms in the alkyl group, and halogenated styrenes.

Instead of (meth) acrylamide, there may also be used N-monoalkyl- and N-dialkyl-substituted (meth) acrylamides having from 1 to 8 carbon atoms in the alkyl group, as well as N-methoxymethyl acrylamide.

The monomers grafted on the bases are preferably acrylonitrile, acrylamide and styrene.

The mixture of substances consists essentially of:

(A) from 10 to 80%, by weight, of ethylene/vinyl ester, preferably ethylene/vinyl acetate, copolymer; and (B) from 90 to 20%, by weight, of monomer mixture to be grafted consisting essentially of:
(I) from 5 to 50%, by weight, preferably from 5 to 30%, by weight, of (meth) acrylonitrile;
(II) from 94.9 to 35%, by weight, preferably from 92.5 to 58%, by weight, of one or more aromatic monovinyl compounds; and
(III) from 0.1 to 15%, by weight, preferably from 2.5 to 12%, by weight, of (meth) acrylamide or of a N-substituted (meth) acrylamide.

The sum of components (I) to (III) is 100%, by weight.

The graft copolymers obtained consist essentially of:

(A) from 10 to 80%, by weight, preferably from 15 to 25%, by weight, of ethylene/vinyl ester, preferably ethylene/vinyl acetate, copolymer; and (B) from 90 to 20%, by weight, preferably from 85 to 75%, by weight, of grafted resin phase formed by copolymerisation of (meth) acrylonitrile, aromatic monovinyl compounds and (meth) acrylamide or a N-substituted (meth) acrylamide.

The resin phase consists essentially of:
(I) from 5 to 50%, by weight, preferably from 5 to 30%, by weight, of (meth) acrylonitrile;
(II) from 35 to 94.9%, by weight, preferably from 58 to 92.5%, by weight, of aromatic monovinyl compounds; and
(III) from 0.1 to 15%, by weight, preferably from 2.5 to 12%, by weight of (meth) acrylamide or of a N-substituted (meth) acrylamide.

The sum of components (I) to (III) is 100%.

These graft copolymers generally have intrinsic viscosities of from 0.6 to 3.0 dl/g, preferably from 1.0 to 2.5 dl/g, determined in dimethyl formamide at 25° C. In these products, the monomers are to a large extent grafted on the base, but minor quantities of ungrafted copolymer and ungrafted base may also be present.

The grafting reaction may be carried out in homogeneous or heterogeneous phase. If grafting is to be carried out in solution, the nature of the solvent used depends on the vinyl ester content of the copolymer. For vinyl ester contents below 30%, by weight, the solvents used are preferably hydrocarbons, such as benzene and toluene or chlorobenzene. For higher vinyl ester contents, alcohols are preferred, especially tertiary butanol.

The grafting reaction on ethylene/vinyl acetate copolymers may also be carried out solvent-free. Such solvent-free grafting is preferably carried out continuously. The average residence time in the reactor and the temperature must then be adjusted to the decomposition constant and the concentration of the initiator in order to achieve a certain conversion rate and obtain sufficiently high molecular weights. This method ensures relatively uniform chemical distribution of the monomers in the resin phase.

The graft copolymerization reaction may be released by irradiation or by initiators which supply radicals. Suitable polymerisation initiators include azo-compounds, such as axo-bis-isobutyric acid nitrile, and, particularly, percompounds, such as dibenzoyl peroxide, tertiary butyl perpivalate, tertiary butyl peroctoate, diacetyl peroxide, lauryl peroxide and succinyl peroxide.

For solution polymerisation the concentration of initiator may be from 0.1 to 1.0%, by weight, preferably from 0.3 to 0.5%, by weight, based on the quantity of monomer mixture used. Graft polymerisation may be carried out at temperatures of from 40° to 250° C., preferably from 60° to 120° C. For obtaining high molecular weights and high graft yields, graft polymerisation is preferably started at relatively low temperatures, for example at from 60° to 70° C., and completed at temperatures of from 80° to 100° C.

The grafting reaction may also be carried out in an aqueous heterogeneous phase to obtain certain effects, such as cross-linking of the ethylene copolymer. For this purpose, graft polymerisation is preferably started by heating a solution of ethylene/vinyl ester copolymer in a mixture of the above mentioned monomers to a reaction temperature of from 60° to 90° C. in the presence of from 0.01 to 0.5%, by weight, of peroxides of the type mentioned above. When polymerisation has progressed to a conversion rate of from 20 to 30%, the graft polymerisation reaction is completed as a bead polymerisation by the addition of a mixture of water and solution of dispersing agent and heating to from 80° to 100° C.

The ratio of aqueous to organic phase under these conditions should be from 2:1 to 5:1. Examples of suitable dispersing agents include: polyvinyl alcohol, partially saponified polyvinyl acetate, cellulose derivatives, such as methyl or β-hydroxyethyl cellulose, styrene/acrylic acid copolymers or saponified styrene/maleic acid anhydride copolymers, methacrylic acid/methyl methacrylate copolymers, polyacrylamide and polyacrylic acid.

The quantity of dispersing agents used may range from 0.01 to 3%, by weight, preferably from 0.5 to 2%, by weight, based on the quantity of organic phase put into the process.

If this solvent-free polymerisation is carried out at from 80° to 120° C. partial cross-linking of the graft base occurs. This results in improved mechanical properties, e.g. higher impact strength and better processing properties. The same effect may also be obtained when polymerisation from a graft copolymer which has been prepared solvent-free or in solution is completed in a polymerisation screw at from 120° to 250° C. with the addition of peroxide.

From 80 to 100% of the monomers are grafted on the base in the methods described above, whereas without acrylamide under the same conditions about 30%, by weight, or more of the monomers put into the process, depending on the graft base used, exists as free copolymer.

The use of acrylamide leads to graft copolymers having a uniform chemical distribution. The lengths of the branches of the graft decrease with increasing acrylamide content while the number of branches per substrate molecule increases. This is illustrated by an example of fractional precipitation of a graft copolymer (Example 7) which has a very uniformly chemical distribution, as may be seen from the nitrogen and oxygen values of the individual fractions (Table 1). The graft copolymers according to the present invention may also be fractionated by means of separating liquids (dimethyl formamide/methyl cyclohexane). By this method, the graft copolymers are very sharply separated according to the chemical composition of the polymer molecules and hence also according to the lengths of the branches of the graft and the molecular weight of the graft substrate (R. Kuhn, Makromolekulare Chem. 177 (1976) 1525). The methylcyclohexane (MCH) phase contains ungrafted ethylene/vinyl acetate copolymer and a copolymer having only a small number or only short graft branches. The dimethyl formamide (DMF) phase contains ungrated resin and graft base having low molecular weight (Table 2).

The analytical figures obtained indicate the presence of differingly grafted base, which is partly due to the wide molecular weight distribution of the base. They also indicate that certainly only a very small amount if any of ungrafted substrate and free resin phase is present because no further separation is achieved by additional fractionating.

The products obtained according to the present invention are suitable for use as coating materials and resins which may be thermoplastically processed. They may easily be processed by the conventional machines used in thermoplast technology.

Table 1:

| Fractional precipitaton of a graft copolymer (Example 7). | | | | |
|---|---|---|---|---|
| Fraction | % by weight | N(% by weight) | O(% by weight) | (η)THF,25° C. (dl/g) |
| 1 | 43.41 | 4.7 | 5.7 | 2.94 |
| 2 | 25.84 | 4.85 | 3.6 | 2.32 |
| 3 | 11.94 | 6.0 | 4.1 | 1.20 |
| 4 | 11.39 | 5.65 | 5.5 | 0.64 |
| 5 | 2.28 | 5.0 | 5.6 | 0.45 |
| 6 | 2.43 | 1.45 | 23.1 | — |

Table 2:

| Separation into fractions by means of separating liquids (DMF/MCH) (Example 7) | | | |
|---|---|---|---|
| Phase | %, by weight | N(%, by weight) | O(%, by weight) |
| DMF | 61 | 6.6 | 2.6 |
| MCH | 39 | 3.55 | 9.3 |

EXAMPLES 1 to 5

2400 g of an ethylene/vinyl acetate copolymer having a vinyl acetate content of 45%, by weight, and a Mooney viscosity of 20 were dissolved in 16 liters of tertiary butanol at 60° C. in a 40 liter stirrer-equipped autoclave. A solution of 7700 g of styrene, 2600 g of acrylonitrile, 40 g of tertiary butyl perpivalate, 2000 ml of tertiary butanol and (1) 150g=1.4%, by weight, of acrylamide (based on monomer mixture)

(2) 300g=2.8%, by weight, of acrylamide (based on monomer mixture)

(3) 450g=4.2%, by weight, of acrylamide (based on monomer mixture)

(4) 600g=5.5%, by weight, of acrylamide (based on monomer mixture)

(5) 1150g=10.0% by weight, of acrylamide (based on monomer mixture) was pumped in at 60° C. over a period of 2 hours and the reaction mixture was then polymerised at this temperature for 6 hours. The temperature was then raised to 80° C. and polymerisation was completed by heating at this temperature for a further 8 hours. The solvent and residual monomers were removed by steam distillation. From 10 to 12 kg of a pulverulent graft polymer were obtained in each case, i.e. from 73 to 84% conversion was obtained in Examples 1 to 5.

EXAMPLE 6

The procedure was the same as in Example 4. The solvent and residual monomers were completely evaporated off in a screw.

EXAMPLE 7

An ethylene/vinyl acetate copolymer containing 45%, by weight, of vinyl acetate and having a Mooney viscosity of 40 was used as graft base and polymerisation was carried out as in Example 4.

EXAMPLE 8 (Comparison Example)

This Example was carried out in the same way as in Examples 1 to 5, but without the use of acrylamide.

Some experimental results of the graft copolymers obtained in Examples 1 to 8 are summarised in Table 3. The following standards were used for the properties determined:

| | |
|---|---|
| Impact strength | $a_n$ according to DIN 53 453 |
| Notched impact strength | $a_k$ according to DIN 53 453 |
| Modulus elasticity | according to DIN 53 457 |
| Vicat temperature, Method B | according to DIN 53 460. |

Table 3

Mechanical properties of a graft copolymers obtained using acrylamide.

| Example | Ethylene-/vinyl acetate copolymer in graft copolymer (%, by weight) | $a_n^{(1)}$ (KJ/m²) | $a_k^{(1)}$ (KJ/m²) | Vicat (B) °C. | F-modulus (N/mm²) | $[\eta]^{(2)}$ (dl/g) |
|---|---|---|---|---|---|---|
| 1 | 21.7 | 32 | 7 | 69 | 1340 | 1.61 |
| 2 | 21.4 | 64 | 12 | 91 | 1830 | 1.56 |
| 3 | 25.5 | 87 | 17 | 87 | 1880 | 1.17 |
| 4 | 21.0 | unbroken | 10 | 92 | 2030 | 1.41 |
| 5 | 23.6 | 78 | 15 | 83 | 1710 | 0.99 |
| 6(3) | 24.8 | 70 | 6 | 92 | 1840 | 1.54 |
| 7(3) | 22.0 | unbroken | 6 | 100 | 2170 | 1.70 |
| 8(4) | 18.9 | 62 | 4.7 | 96 | 2356 | 1.20 |

(1) Measurements at room temperature
(2) In dimethyl formamide, 25° C.
(3) Acrylamide content as in Example 4
(4) Comparison Example without acrylamide

We claim:

1. A graft copolymer consisting essentially of
   (A) from 10 to 80%, by weight, of an ethylene/vinyl ester copolymer having a vinyl ester content of from 1 to 75%, by weight;
   and, grafted thereon,
   (B) from 90 to 20%, by weight, of a monomer mixture consisting of
   (I) from 5 to 50%, by weight, of acrylonitrile and-/or methacrylonitrile;
   (II) from 94.9 to 35%, by weight, of an aromatic monovinyl compound;
   and
   (III) from 0.1 to 15%, by weight, of an optionally N-substituted acrylamide and/or methacrylamide;
   the sum of (A) and (B) being 100%, by weight.

2. A copolymer as claimed in claim 1 consisting essentially of from 15 to 25%, by weight, of (A), the vinyl ester content of which is from 35 to 50%, by weight, and from 85 to 75%, by weight, of (B), (B) consisting of from 5 to 30%, by weight, of (I), from 92.5 to 58%, by weight, of (II) and from 2.5 to 12%, by weight, of (III).

3. A copolymer as claimed in claim 1 comprising, as vinyl ester, vinyl acetate and, as (B), acrylonitrile, styrene and acrylamide.

4. A process for the preparation of a copolymer as claimed in claim 1 which comprises polymerising (B) in the presence of (A) and in the presence of a radical-former.

* * * * *